United States Patent
Rosshirt et al.

[11] 4,070,608
[45] Jan. 24, 1978

[54] TWO AXES NC SYSTEM WITH TOOL OFFSET

[75] Inventors: Hermann Rosshirt, Bristol; Robert J. Jarosik, Southbury, both of Conn.

[73] Assignee: The Superior Electric Company, Bristol, Conn.

[21] Appl. No.: 643,180

[22] Filed: Dec. 22, 1975

[51] Int. Cl.² ............................................. G05B 19/24
[52] U.S. Cl. ..................................... 318/572; 364/107
[58] Field of Search .............................. 318/572, 573; 235/151.11

[56] References Cited

U.S. PATENT DOCUMENTS

| | | | |
|---|---|---|---|
| 3,593,091 | 7/1971 | Ross | 318/572 |
| 3,770,947 | 11/1973 | Deily | 318/572 |
| 3,866,027 | 2/1975 | Cutler | 235/151.11 |
| 3,939,330 | 2/1976 | Fluet | 235/151.11 |

OTHER PUBLICATIONS

Tschumi, J., "Tool Radius Correction for True Contour Programming," Brown Boveri Rev., vol. 57, pp. 456–459, 11/70.
Wortzman, D., "Cutter Compensation in Numerical Control," IBM Tech. Disclosure Bulletin, vol. 12, No. 1, p. 152, June 1969.

Primary Examiner—B. Dobeck
Assistant Examiner—John J. Feldhaus
Attorney, Agent, or Firm—Ernest M. Junkins

[57] ABSTRACT

Tool offset compensation for a commanded path for a two axes NC system that produces movement by axis determination of sequential steps, is provided by having the tool offset the desired value, placing the tool center in the same quadrant as the direction of the commanded path and then making the tool center normal to the beginning of the commanded path. For a linear commanded path, the NC system then produces the commanded path while for an arcuate commanded path, the radius of the movement path produced is made to be the algebraic sum of the commanded path and tool center radii with additional incremental alterations without a corresponding movement being made in the numerical extent of the commanded path to utilize the same numerical extent for controlling the extent of the movement path.

21 Claims, 10 Drawing Figures

TWO AXES NC SYSTEM WITH TOOL OFFSET

The present invention has particular utility when used with a numerical control system of the type shown in U.S. Pat. Nos. 3,525,917 and 3,585,478, both assigned to the assignee of the present invention. Both systems accept commands for a linear or arcuate path and then produce a movement that essentially corresponds to the commanded path by sequential individual steps along either the X or Y axes. A determination is made after each step for setting the axis on which the next step is to be taken in order to minimize the deviation of the movement path from the commanded path. Determinations are continued until the number of steps needed to complete the path have been produced.

If it is desired to produce a surface by the periphery of a tool, it becomes essential that the path of movement be the path that the tool center has to follow with the difference between the commanded and tool center paths generally being referred to as tool offset or compensation and its value is generally numerically equal to the radius of the tool. One heretofor suggested manner of providing tool offset has involved calculations that modify the commanded path commands to be those required by the tool center path and then supplying the tool center path commands as the commands to the NC system for the path that is to be produced. Another manner has involved accepting information of at least two command paths and then computing the tool center path within the NC system by using the information of the present and next command paths. Both suggestions involve not only relatively complex computation systems but also generally access to the commands of the next path prior to the execution of a present commanded path. Moreover, the first manner generally requires new tool center path commands each time the extent of the tool offset is altered, which frequently occurs when a tool is changed.

It is accordingly an object of the present invention to provide a two axes NC system that accepts information of a commanded path and the desired value of tool offset and provides actual movement along the tool center path.

Another object of the present invention is to achieve the above object with a tool offset circuit and method that is extremely compatible with the NC systems disclosed in the above-noted patents and which is capable of accepting commanded path information in essentially the same manner and form as required by said NC systems.

A further object of the present invention is to provide an NC system that includes tool offset circuitry which is capable of being constructed as a hard wired circuit, which may be relatively economically manufactured for the results that it achieves and which utilizes many components of heretofore manufactured NC systems.

In carrying out the present invention of a NC system having a tool offset circuit, it is preferred that the NC system be of the type that is disclosed in the above-noted patents. In the absence of a tool offset command, such a system uses a linear path interpolator means to produce a linear commanded path and a circular path interpolator means to produce an arcuate commanded path with each interpolator means functioning to determine the axis on which each sequential step should be taken to minimize the deviation between the actual movement path and the commanded path. The present tool offset circuit basically adds to the above NC system, a circular tool interpolator means, a slope comparator means and a ratio interpolator means with the slope comparator means being basically logic circuitry and counters, the ratio interpolator means functioning somewhat as a linear path interpolator means and the circular tool interpolator means being essentially identical to the circular path interpolator means of the NC system.

In utilizing the above structure, the tool offset circuit for producing a tool center movement path initially assures that the tool center is in the same quadrant for movement to move in the same direction, i.e. without crossing another axis, that movement is required by the commanded path. If the tool center is not so located, an uncommanded movement is automatically produced to position it on an axis in this quadrant, while if tool offset is not present and is initially being introduced, then an uncommanded movement along this axis is effected for an extent equal to the tool radius. The quadrant positioning movement uses information only of the direction of the next commanded path to determine the proper quadrant and uses the circular tool interpolator means to cause arcuate movement of the tool when such positioning is needed while the initial positioning uses the linear path interpolator means.

With the tool center positioned in the proper quadrant, the tool center is made normal to the beginning of the commanded path by an uncommanded arcuate movement of sequential steps on the X and Y axes utilizing the circular tool interpolator means to determine each arcuate step. The slope interpolator means is used to provide information of the extent of a slope line that is perpendicular to the commanded path and either the circular tool interpolator means or the slope comparator means are sequentially itinerated to produce a change in their line's extent. A comparison is made after each itineration and whichever has the lesser extent is next itinerated. When the extent of the tool center equals within one step the extent of the slope line, the tool center is located within one step of being perpendicular to the beginning of the commanded path.

For a linear commanded path, the NC system then functions to carry out the linear commands as disclosed in the above-mentioned prior patents for producing linear movement using the linear path interpolator means. For an arcuate commanded path, where it is required that the movement be along an arc defined by $i$ and $j$ values for the radius and for an extent of X and Y steps, the tool offset circuit alters the $i$ and $j$ radius information by the algebraic addition of the tool radius and the commanded path arc radius. The extent of the movement, namely X and Y steps, is maintained the same as that in the commanded path and the system uses the circular path interpolator means to produce the arcuate movement. During the movement, the ratio interpolator means determines whether a step should be attributal to the tool radius or to the commanded path radius by the ratio of their extents and if it is to the tool radius, then no movement is produced but the numerical extent of either the X or Y steps is altered by a determination of the circular tool interpolator means. On the other hand, if the ratio interpolator means determines that the step is attributal to the commanded path radius, then a movement is produced by the NC system and either the X or Y step is decremented. By using both circular interpolator means to control the number of the steps along the axis, the system does not require that the commanded path number of steps be initially altered in order to produce the movement, thereby rendering it compatible with the prior NC systems without substantial changes therein.

Other features and advantages will hereinafter appear.

Figure 1:
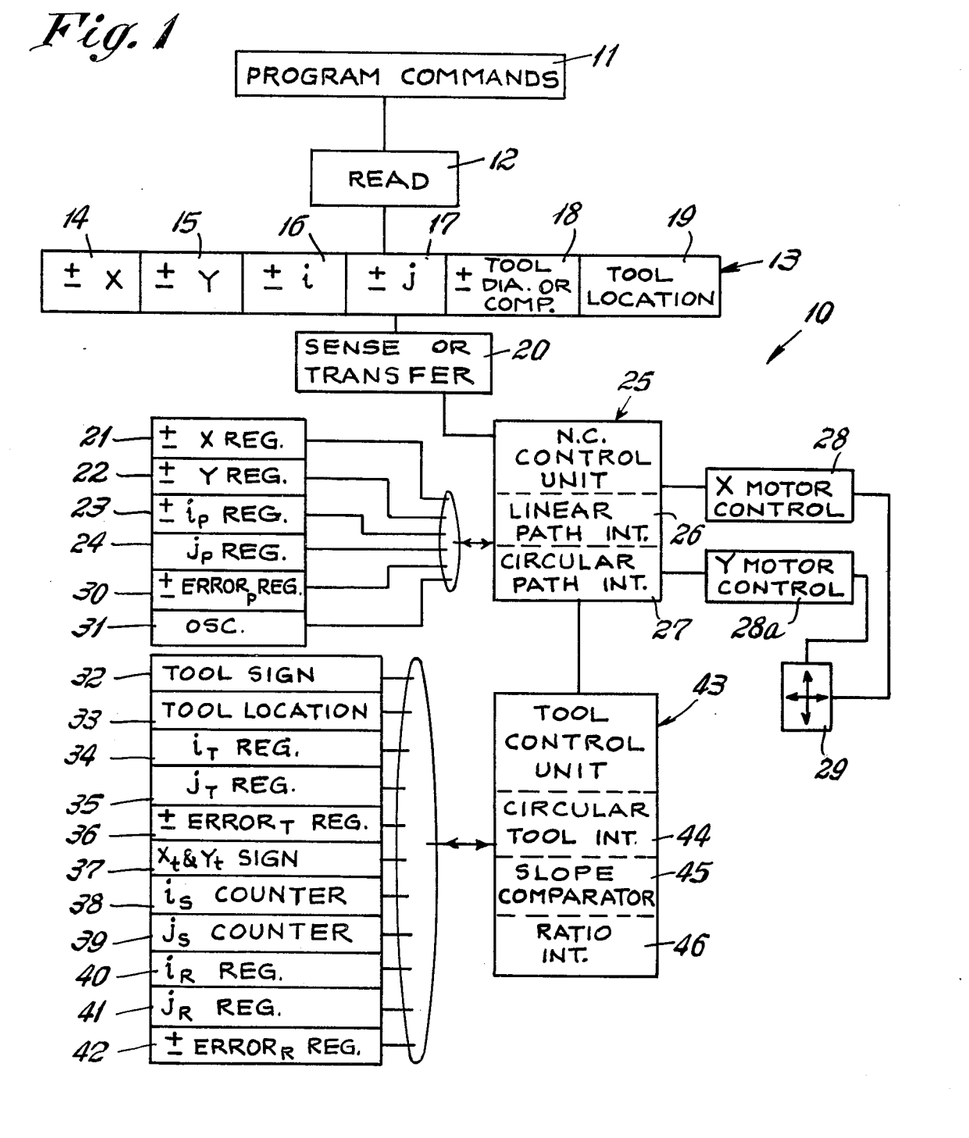
FIG. 1 is a block diagram of two axes NC system having the present invention of a tool radius offset circuit incorporated therein.

Referring to the drawing, the numerical control system having a tool offset circuit incorporated therein is generally indicated by the reference numeral 10 and includes a block denoted program commands 11 in which information of commanded paths and tool commands are sequentially stored and which may consist, if desired, of a tape reader for reading the information contained on tape that is appropriately punched.

The next information in the block 11 is transferred by activation of a read block 12 to a buffer storage generally indicated by the reference numeral 13 and which include registers 14, 15, 16 and 17 for storing the $\pm X$, $\pm Y$, $\pm i$ and $\pm j$ information of a commanded path. In addition, there is a register 18 which stores an indication of the diameter of the tool or the extent of the compensation which is desired together with its direction. Further, a block 19 stores information from the program commands of the commanded tool location with respect to the path, namely whether the tool center is to be positioned on the left or the right of a commanded path and also if it is to be eliminated. The register 18 may take any desired form and may obtain information from either the program commands 11 or from an independently operable device such as a thumb wheel display switch or other operator settable device.

A block 20, when actuated, effects the transfer of the information from the buffer storage 13 into other registers of the NC system with registers 21, 22, 23 and 24 receiving the stored information of a commanded path to be executed from the registers 14, 15, 16 and 17, respectively and thus are denoted $\pm X$ reg.; $\pm Y$ reg.; $\pm iP$ reg. and $\pm jP$ reg.

The four registers 21 through 24 together with the sense or transfer block 20, is connected to a program control unit 25 which includes a linear path interpolator means 26 and a circular path interpolator means 27.

The output of the unit 25 consists of pulses that are directed to either an X motor control 28 or a Y motor control 28a with each pulse to the X motor control producing a movement of a part or machine element 29 along an X axis while each pulse to the Y motor control 28a produces a step along the Y axis of the part or element 29.

With the exception of the tool diameter or compensation block 18 and tool location block 19, but including a block 30 denoted error P reg. and an oscillator 31, the heretofore mentioned elements and their interaction are disclosed in either of the two above-noted U.S. Patents. It will be understood that while the block 20 normally is only a transfer block, as will be hereinafter set forth, it is modified to include the ability to sense information contained in the buffer storage 13 and especially the direction or signs in the X register 14 and the Y register 15.

The tool offset circuit of the NC system 10 includes a tool sign storage 32 for storing the direction, i.e., plus or minus of the compensation initially supplied in the block 18 and is thus basically only a flip-flop. The tool location 19 information is transferred to a tool location block 33 which may also consist essentially of a pair of flip-flops for storing the command of whether the tool is on the left or the right of the commanded path or is to be eliminated. Other elements in the tool offset circuit include an $iT$ register 34, a $jT$ register 35, an error T register 36, flip-flops 37 for storing XT and YT signs, an $iS$ counter 38, a $jS$ counter 39, an $iR$ register 40, a $jR$ register 41 and an error R register 42. Each of the registers are basically up-down counters that can have their counts changed, sensed, or set together with where indicated, maintain the algebraic sign of their counts. The elements 32 through 42 are connected to a tool control unit 43 that includes a circular tool interpolator means 44, a slope comparator means 45 and a ratio interpolator means 46. The circular tool interpolator means 44 is structurally and functionally similar to the circular path interpolator means 27 and utilizes the $iT$ register 34, the $jT$ register 35 and the error T register 36, together with the X and Y signs in block 37 to move the tool center along an arcuate path by determination of the axis for each sequential step. The tool interpolator means 44 is utilized whenever arcuate movement of the tool is needed or should be provided, with the location of the tool center being known by the values in the registers 34 and 35.

The slope comparator 45 is basically logic circuitry that directs actuation and compares the results from the linear path interpolator means 26 and the circular tool interpolator means 44 and uses the $iS$ counter 38 and $jS$ counter 39 to maintain numerical values representing the extent of a slope line. Rather than providing a duplicate of the linear path interpolator means 26, it had been found advantageous to utilize the interpolator means 26 in the slope line determination as the interpolator means 26 is not in use when the system is producing arcuate tool center movements to make the tool center normal to the commanded path.

The ratio interpolator means 46 is basically a ratio divider somewhat structurally similar to the linear path interpolator means 26, and uses the $iR$ and $jR$ registers 40 and 41 together with the sign of the error R register 42 for directing sequential itineration of either the circular path interpolator means 27 or the circular tool interpolator means 44. The selection is made in accordance with the relative proportion of tool radius and commanded path radius to the movement radius during an arcuate movement. Thus substantial components of the present system are functionally, if not structurally, identical to the components in the NC systems disclosed in the above-noted U.S. Patents. Moreover, the NC systems disclosed are not required to function any differently than described in said patents.

The NC systems disclosed in the above-noted patents are manufactured by the assignee of the present invention using hard wired circuitry employing numerous commercially available integrated circuit devices. In view of the similarity of the interpolators and comparators 44, 45 and 46 with those of the NC system, if not actual identicalness, it is preferred that such interpolators also be constructed as hard wired circuits. In addition, the tool control unit 43 is also preferably constructed of hard wired components using integrated circuit logic elements to perform the steps hereinafter described to provide tool offset in the NC system. Thus, while the description of the manner of operation of the system is set forth in a manner that could be representative of a flow chart for a general purpose computer, such steps are preferably performed by hard wired circuitry though, of course, if desired they may be performed by a computer properly programmed to follow the steps.

Figure 2:
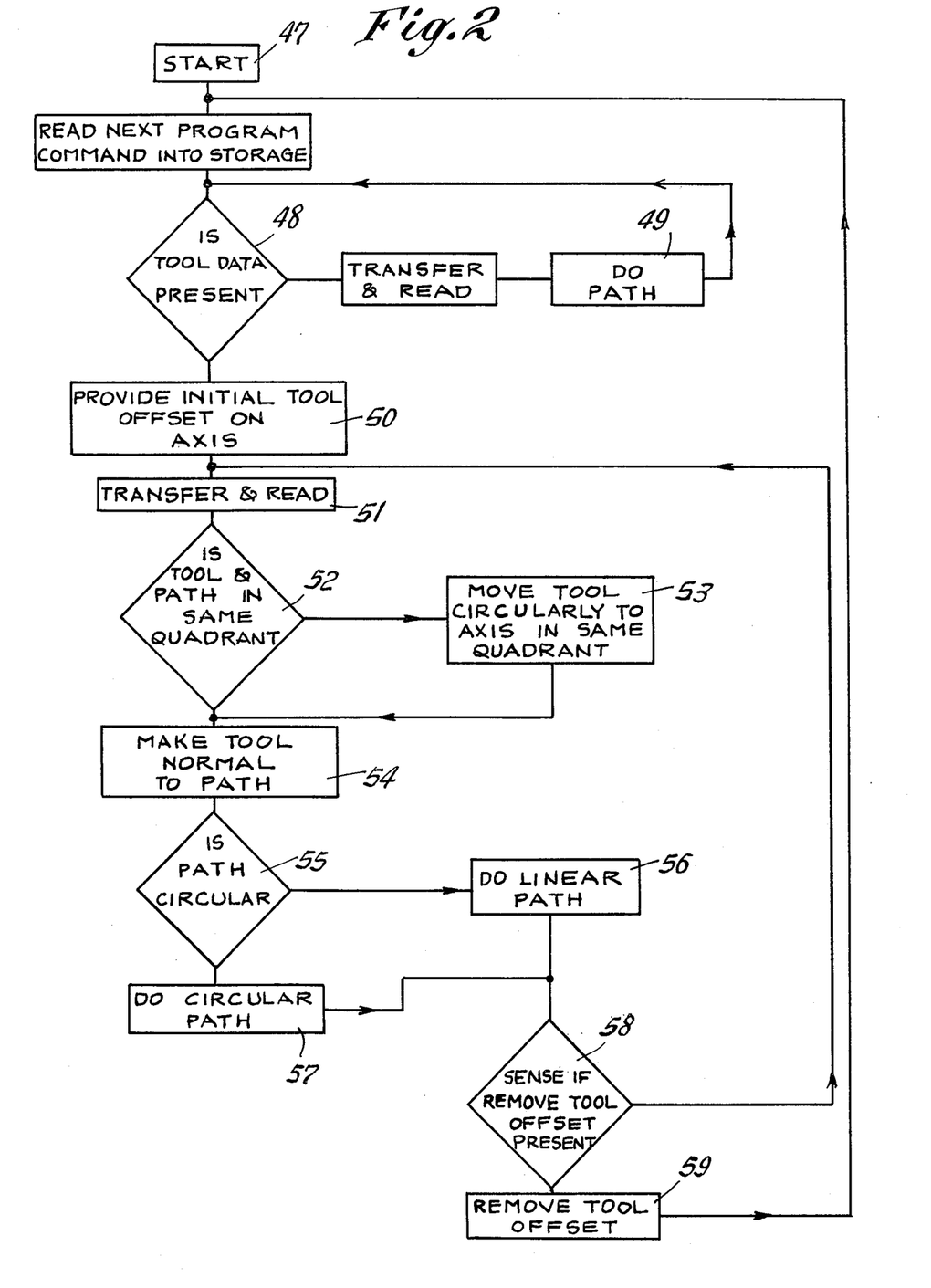
FIG. 2 is a chart showing broadly the sequential steps performed by the NC system in carrying out the producing of tool offset movements.

Referring to FIG. 2, which is a chart of the overall sequence of operation of the NC system 10, initiation of the system by a start block 47 causes actuation of the read block 12 to place the next program command from the program commands 12 into the buffer storage 13. A block 48 interrogates the stored program to determine if a tool command is present in the tool location 19, and which can only consist of a command for either left, right or to eliminate tool offset. If no tool data is present, the block 20 is actuated and also the block 12 to transfer the stored program from the buffer storage 13 into the registers 21 through 24 and to transfer the next program into the buffer storage 13. A block 49 actuates the NC system to produce the commanded path movement in the manner disclosed in the two above-noted patents in the same manner as if the tool offset circuit of the present invention was not present.

Figure 3:
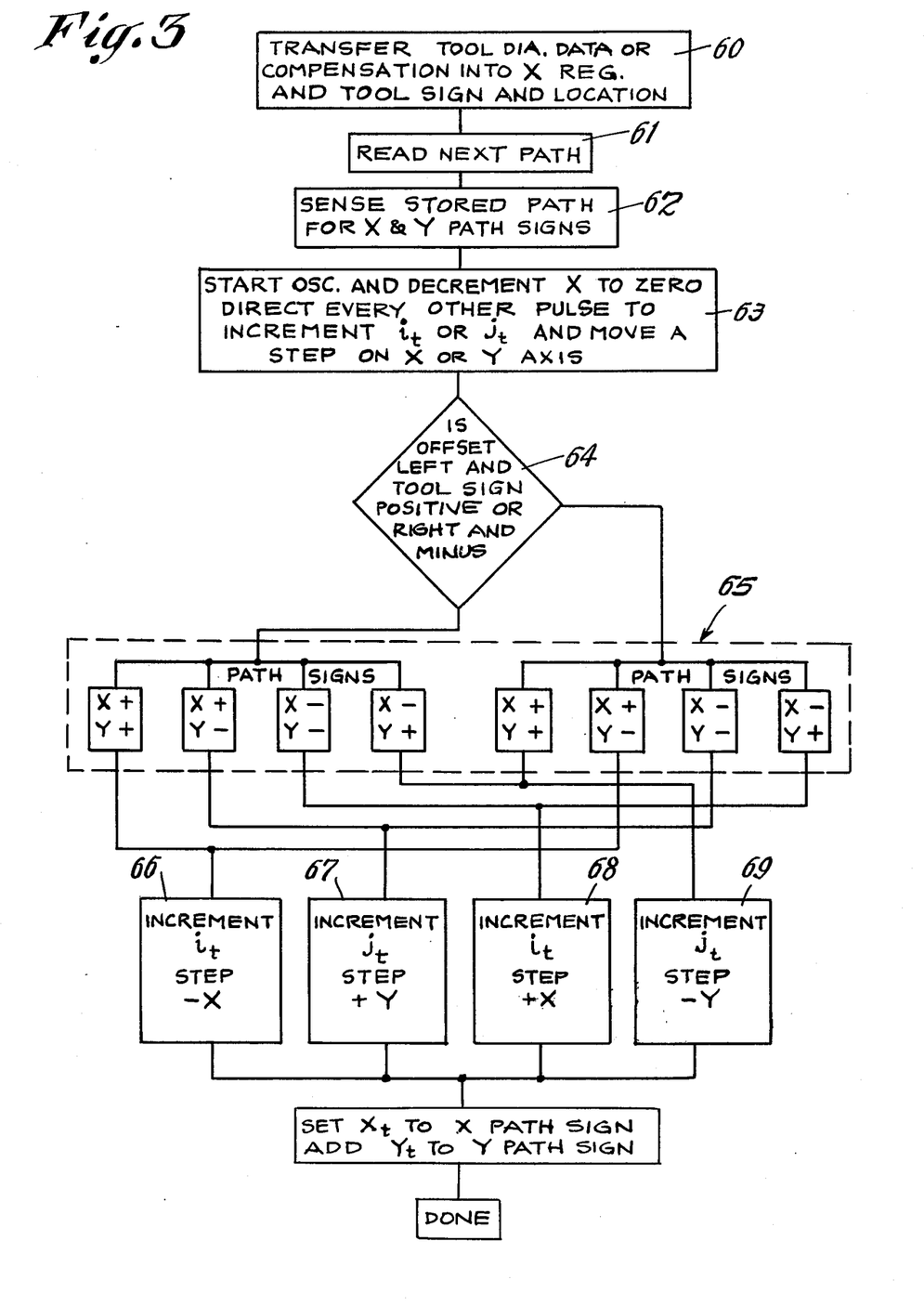
FIG. 3 is a chart of the steps performed by the NC system for providing an initial tool offset as an uncommanded movement.

On the other hand, if a tool location command of either left or right, is present, then the operations set forth in FIG. 3 are performed as indicated by a block 50 to provide the initial tool offset. The block 50 is thus only used to provide the initial offset when offset is not present from a previous command, and thereafter a block 51 effects the transfer of the next program which is that of a commanded path into the registers 21 through 24 and the subsequent program into the buffer storage 13. If the block 50 is used to provide for the initial offsetting of the tool center from the commanded path the distance commanded by the block 18, then the offset is on an axis which positions the tool center in the same quadrant as that of the commanded path. However, if there already has been tool offset, then the system has a block 52, which questions if the tool center and the commanded path are located in the same quadrant so as to move in the same direction. If they are not, as may happen for other than the initial offsetting, then a block 53 actuates the sequence of operations shown in FIG. 5 for a movement that is diagrammatically represented in FIG. 4 until the tool center is located in the proper quadrant.

Figure 6:
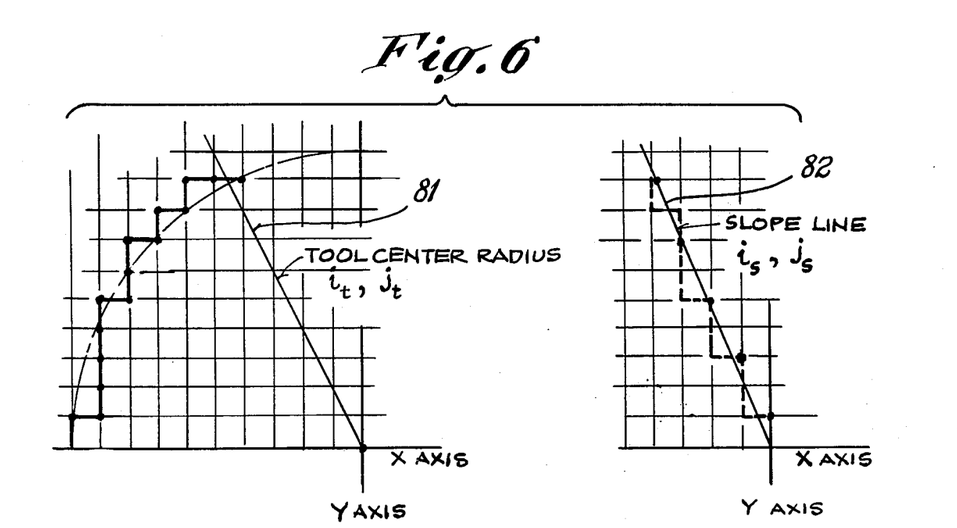
FIG. 6 is a diagrammatic representation of the positioning of the tool center to a location normal to the beginning of a commanded path.
Figure 7:
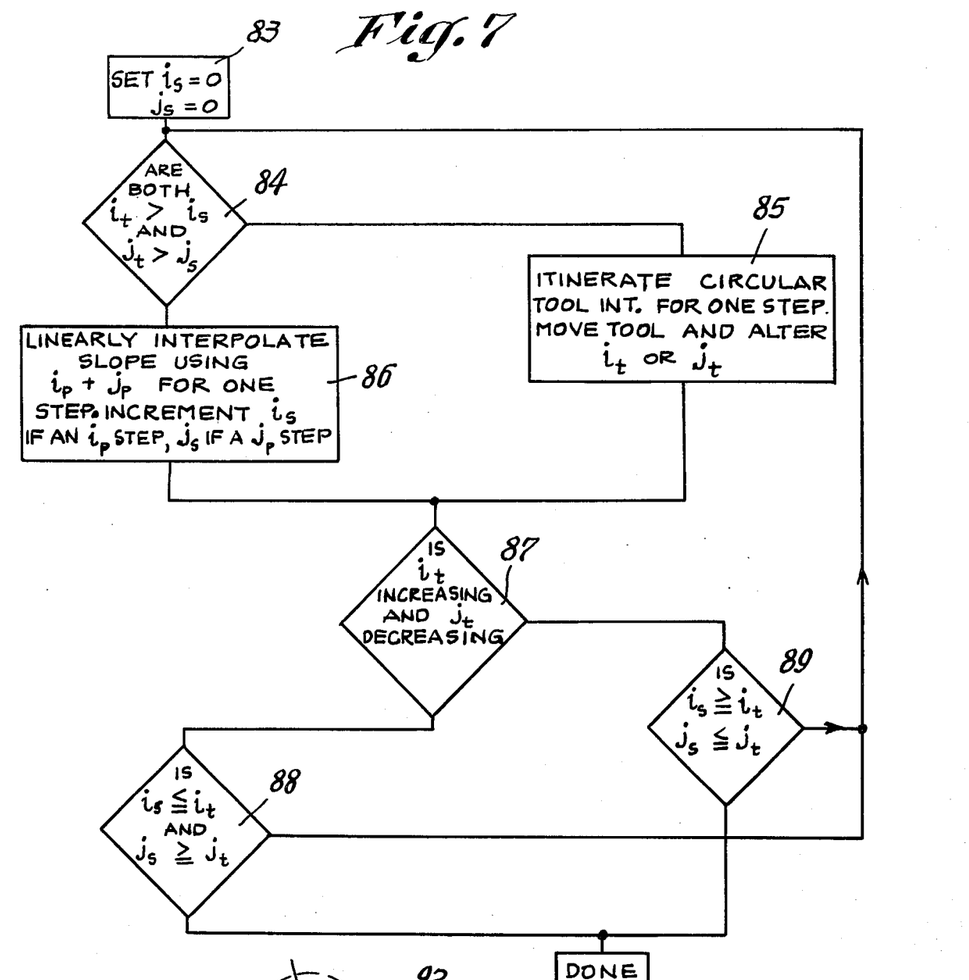
FIG. 7 is a listing of the steps for producing the tool normal location represented in FIG. 6.

When the tool center thus is positioned in the proper quadrant, a block 54 requires that the tool center be made perpendicular or normal to the start of the commanded path with this block representing the operations set forth in FIG. 7 and diagrammatically represented in FIG. 6.

A block 55 then interrogates the commanded path in the registers 21 through 24 to determine if the path is circular by the inclusion of $i$ and/or $j$ data in registers 23 and 24, and if the path is not circular, i.e. it is linear, then a block 56 instructs the linear path interpolator means 26 to perform the movement commanded in the same manner as if tool offset had not been present. On the other hand if the program is circular, a block 57 causes the operations set forth in FIG. 9 and diagrammatically represented in FIG. 8, to be performed. Upon completion of a commanded path by either the linear path block 56 or the circular path block 57, a block 58 senses if the information in the buffer storage 13 of the next program command is to eliminate tool offset by a command in the tool location block 19. If it is present, then a block 59 effects the removal of the offset by performing the operation shown in FIG. 10. Upon completion thereof, the next program is read into the buffer storage and thereafter the block 48 is encountered to determine if tool offset must be effected.

If, on the other hand, tool offset is not present in the next command, then the system is referred back to the block 51, the information in the buffer storage 13 for the next commanded path is transferred into the registers 21 through 24 and the next program command is read into the buffer storage.

In the specific embodiment of the tool compensation system herein disclosed, it is required that information for adding tool offset or compensation or for eliminating it, be supplied as a separate program command that is acted upon prior to reading the next program command containing information of a commanded path.

In considering each of the specific operations performed by the block 50 to provide the initially commanded extent of tool offset, reference is made to FIG. 3 wherein a block 60 causes information of the tool diameter or compensation located in block 18 to be transferred to the X register 21 as a numerical value and its sign transferred to the tool sign block 32 together with transference of the tool location information in block 19 into the block 34. The next commanded path is read into the buffer storage by a block 61 and the direction signs for its movement on the X and Y axes in blocks 14 and 15 are caused to be sensed by a block 62 using the block 20. A block 63 initiates operation of the linear path interpolation means 26 of the program control unit 25 to produce a tool movement in a selected direction for an extent in steps that is equal to the tool radius or half the value of the tool diameter information located in the block 18. The system requires that tool diameter or compensation commands be provided as a diameter of the tool or twice the offset. The tool control unit 43 as indicated in the block 63 only permits every other pulse from the oscillator 31 to produce movement of the motor controls 28 and 29 although every pulse decrements the count of the X register 21. Movement is continued, as with a linear commanded path until the count of the X register reaches zero.

Though the tool offset information is contained in the X register 21, the axis, either X or Y and the direction of movement thereon, is determined by way of a block 64 and the commanded path by a logic circuitry that is generally indicated by eight blocks 65. The system uses in block 65 the signs in the registers 14 and 15 and the information in the tool sign block 32 and the tool location block 33, to determine which one of the four directions of movement every other pulse is to produce. Further, the extent of the movement is stored in either the *i*T register 34 for movement on the X axis, or in the *j*T register for movement on the Y axis, as they maintain a count representative of the extent of tool center offset. Also, the direction of movement is stored in the tool sign block 37.

The four possible directional alternatives that exist, are as shown in blocks 66, 67, 68 and 69 with the one block selected being that which is determined by the one specific combination of information. At the completion of the operation shown in FIG. 3, the tool has been moved out an extent on an axis from the start of a commanded path start that is equal to the tool radius, the extent is stored in either the *i*T register 34 or the *j*T register 35 and the direction of movement along the axis is stored in the block 37.

Figures 4, 5:
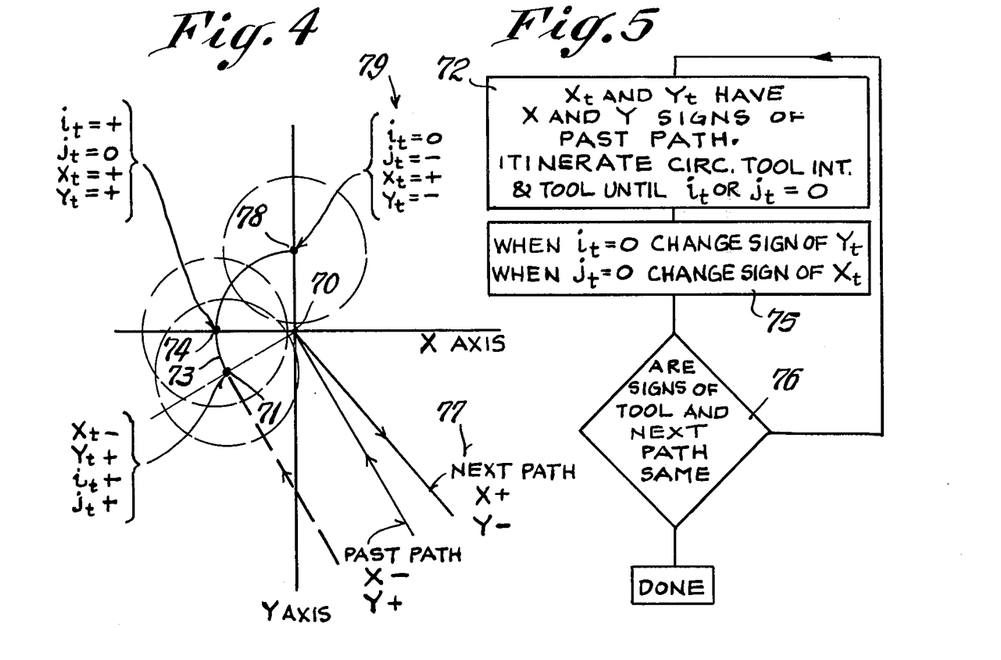
FIG. 4 is a diagrammatic representation of an uncommanded movement that positions the tool center on an axis in the proper quadrant for movement in the same direction as the next commanded path.
FIG. 5 is a listing of the steps required for positioning the tool center on the axis, such as represented in FIG. 4.

The initial offset provided by the operations disclosed in FIG. 3 are used only when tool offset is initially not present (i.e. both the *i*T and *j*T registers have a zero count) and thus the initial offset places the tool center on the axis in the quadrant where the tool center will move in the same direction as the signs of the commanded path dictate. On the other hand, if tool offset already exists, then block 52 determines if the tool center is located in the proper quadrant, though not necessarily on an axis, by comparing the commanded path signs in registers 21 and 22 with the tool signs in block 37. If they are identical, then the sequence continues, while if they are not, then block 53 causes uncommanded tool center movement. Reference is made to FIGS. 4 and 5 in which the decisions and commands set forth in a block 53 are specifically disclosed to position the tool center on the axis in the proper quadrant. After the initial offsetting of the tool center or after completion of a prior commanded path movement, the block 51 effects transference of the buffer storage commanded path to the registers 21 through 24 and the reading of the next program command into the buffer storage.

As shown in the diagrammatic representation of FIG. 4, if an immediately past or completed commanded path direction, indicated by the phrase "past path," terminates at a point 70, the tool center could be at a point 71. The location of the tool center is known by the signs in block 37 and numerical values in the *i*T and *j*T registers 33 and 34. Initially, a block 72 assures the X and Y signs in block 37 to have the signs of the past path 70 and this direction information is applied with the *i*T and *j*T values in registers 35 and 36 to the circular tool interpolator means 44 with instructions to move the tool center until the numerical value of either *i*T and *j*T becomes zero. The circular tool interpolator means 44, with this information of an arc about the point 70, moves the tool along an arcuate path 73 to a point 74 on the X axis in the same way as the circular path interpolator means 27 would produce an arcuate movement if the same commands were given it, namely by sequential step axis determinations. Since the direction is set by the XT and YT signs and since the *i*T and *j*T registers are altered for each step, no numerical values need by supplied for the extent of the movement of arc 73 since movement is terminated for this arc when either one of the tool value registers assumes a zero count.

The movement to the point 74 causes the *j*T register count to be equal to zero, the *i*T register to be equal in value to the tool radius and the signs of the XT and YT to remain − and +, respectively. However, at the point 74, a block 75 reverses the sign of XT in view of the *j*T register count being the register that is equal to zero and a block 76 then compares the signs of XT and YT with the signs of the direction for the next commanded path located in the registers 21 and 22. The block 76 performs the same determination as the block 52 so that if the question asked results in a "yes" answer, the processing continues to the block 54.

If however, the signs are not identical, which would occur if the direction of a next commanded path ("next path") is as indicated by the reference numeral 77 with the signs being + and + vs. + and −, the block 76 then directs the block 72 to actuate the circular tool interpolator means to cause it to move the tool center arcuately about the point 70 until the count of either the *i*T or *j*T registers become zero. In the specific instance shown, the *i*T value becomes zero at a point 78 and the block 75 then changes the sign of the YT flip-flop so that at the point 78, there is the information indicated in FIG. 4 by the arrow 79. The block 76 then compares the "next path" 77 direction signs with the signs in XT and YT. As they are both identical, the tool center is now positioned on an axis in the proper quadrant for movement in the same direction as the next commanded path without crossing another axis.

In moving the tool arcuately, the circular tool interpolator means 44 utilizes the algebraic sign of the error T register 36 in the same manner that the circular path interpolator means 27 uses the sign of the error P register 30 to determine the axis for each sequential tool step. Also the direction is set by the tool signs in the block 37 and the tool location in the block 33, the latter functioning in the same manner as the sign in the *i*P register 23.

The operation commanded by the block 54 of making the tool normal to the commanded path at the start of the path is next performed utilizing the operations disclosed in FIG. 7 with a representative movement thereof being shown in FIG. 6. This normal positioning is achieved by comparing the instantaneous extent of the tool center radius (*i*T, *j*T) with the instantaneous extent of a slope line as defined by the values in *i*S, *j*S that is perpendicular to the direction of the commanded path at the start of the path. The tool center is normal to the path when values of *i*T and *j*T are equal (within one step) of the values of the *i*S and *j*S counters.

In the representation of FIG. 6, the tool center radius is indicated by the reference numeral 81 and the slope line by the numeral 82. In the normal positioning processing, the values of registers *i*T and *j*T are compared with the values of the counters *i*S and *j*S and whichever, in effect has the least extent, has its values altered by the equivalent of one step for the slope line or by an actual step for the tool center radius. In addition to determining which is to be altered, the system also determines which of the two registers or counters of each is to be altered and if an actual tool step is made, the axis on which and the direction that the step is to be taken. After each step, the extents are compared and the processing continues, step by step until the extents are essentially or actually equal, thereby assuring that the tool center location will be within one step of being normal.

The tool center radius 81 values of *i*T and *j*T are altered by itinerating the circular tool interpolator means 44, which uses information in the registers 34, 35 and 36 and block 37 to determine on which axis a step is to be taken, which counter (iT or jT) is to be incremented, and which motor control and direction is to produce the step.

The slope line 82 has its values altered by using the linear path interpolator means 26 with the values therein being the command path values of iP and jP for an arcuate path or XP or YP paths for a linear path with the values being reversed to produce the slope line perpendicular to the command path.

After each step to cause itineration of either the arcuate tool interpolator means 44 or linear path interpolator means 26, the slope comparator 45 compares the values and then either stops further tool center movement as the values are essentially equal or by reason of the unequalness of the values, directs the next itineration to either the interpolator 44 or the interpolator 26. By comparing the relative values of each of the four registers iT, jT, iS and jS after each itineration and providing a pulse, when required to produce a movement, the tool center is thus advanced (if necessary) arcuately, step by step, until it is within one step of being normal to the direction of the commanded path.

The operations performed are disclosed in FIG. 7 and the counters iS and jS are initially set to values of 0 by a block 83 and then a comparison is made between the values of iT and iS and jT and jS by a block 84 representing logic circuitry in the slope comparator 45. The block 84 determines if the circular tool interpolator means 44 is to itinerate and movement produced or if the path interpolator means 26 is to be itinerated and a counter be incremented. When both tool register valves are less than the slope register values, the slope comparator 45 directs itineration of the circular tool interpolator means 44 to move the tool one step on the either X or Y axis as determined by the interpolator means 44 and also to alter by a count of 1, either iT or jT registers, as indicated by a block 85 in FIG. 7. On the other hand when the block 84 determines that the tool register values are greater than the slope line register values, which occurs when the instantaneous tool radius extent is greater than the instantaneous slope line extent, then the slope comparator 45 directs the itineration of the linear path interpolator means 26 to increase the extent of the slope line by one and to determine which register iS or jS is to be incremented. If the interpolator means 26 determines that an X axis step is needed to maintain the path determined by iP and jP then the iS register is incremented while on the other hand for a Y axis step, the jS register is incremented. These operations are indicated in block 86.

After each itineration, whether by the circular tool interpolator means 44 and the actual movement of the tool or by incrementing the slope line registers, blocks 87, 88 and 89 are then utilized to determine whether or not the extents are essentially equal. The block 87 basically determines the arcuate direction in which the tool center is being stepped, while the blocks 88 and 89 make the actual numerical comparison. If the tool center is being stepped clockwise, then the block 88 assures that when the extents are equal or that the last step has caused the extent of the tool radius 81 to be equal to slope line 82, then the block 88 terminates subsequent tool normal positioning. For a counterclockwise movement, a block 89 performs the same function.

It will be understood that both blocks 88 and 89 require that the slope line 82 be linearly interpolated at least for the extent of the tool center radius as determined by values of iT and jT so that when both lines are in effect equal in length further interpolation is stopped as the tool is now positioned normal to the slope of the program within one step. The slope comparator thus basically structurally consists of numerical value comparators with the ability to select, based on the values, itineration of either of the interpolators 44 or 26. Also it is preferred that a relatively high speed oscillator be used for the linear path interpolator to rapidly perform the determinations, with the oscillator 31 being used to provide pulses when needed at a rate compatable to the motor controls 28 and 29.

With the tool center thus positioned normal to the start of the commanded path, the block 55 in FIG. 2 then directs that when the commanded path is linear, that the NC system 25 then produce the path using the linear path interpolator means 26. Since there is no change in the X and Y extent values of the commanded path even after introducing tool offset, the linear path interpolator means 26 functions in its normal manner as if tool offset had not been introduced. On the other hand, if the commanded path is arcuate, the block 57 directs the performance of the specific operations disclosed in FIG. 9 and diagrammatically illustrated in FIG. 8.

For an arcuate commanded path with tool offset, the present NC system treats the commanded path as an arcuate movement having a movement radius that is the algebraic sum of the tool radius and the commanded path radius. As representatively shown in FIG. 8, a typical commanded arcuate path is indicated by the reference numeral 91 and if the tool center is to be positioned on the left hand or outwardly of the arc 91, then the radius for the movement path is equal to the sum of the command path radius and the tool center radius with such an arc being indicated by the reference numeral 92. On the other hand, if the tool center is to be to the right of the commanded path to traverse a movement path 93, then the iT and jT values of the tool radius are subtracted from the iP and jP values of the commanded path for the radius of the movement path.

Figures 9, 10:
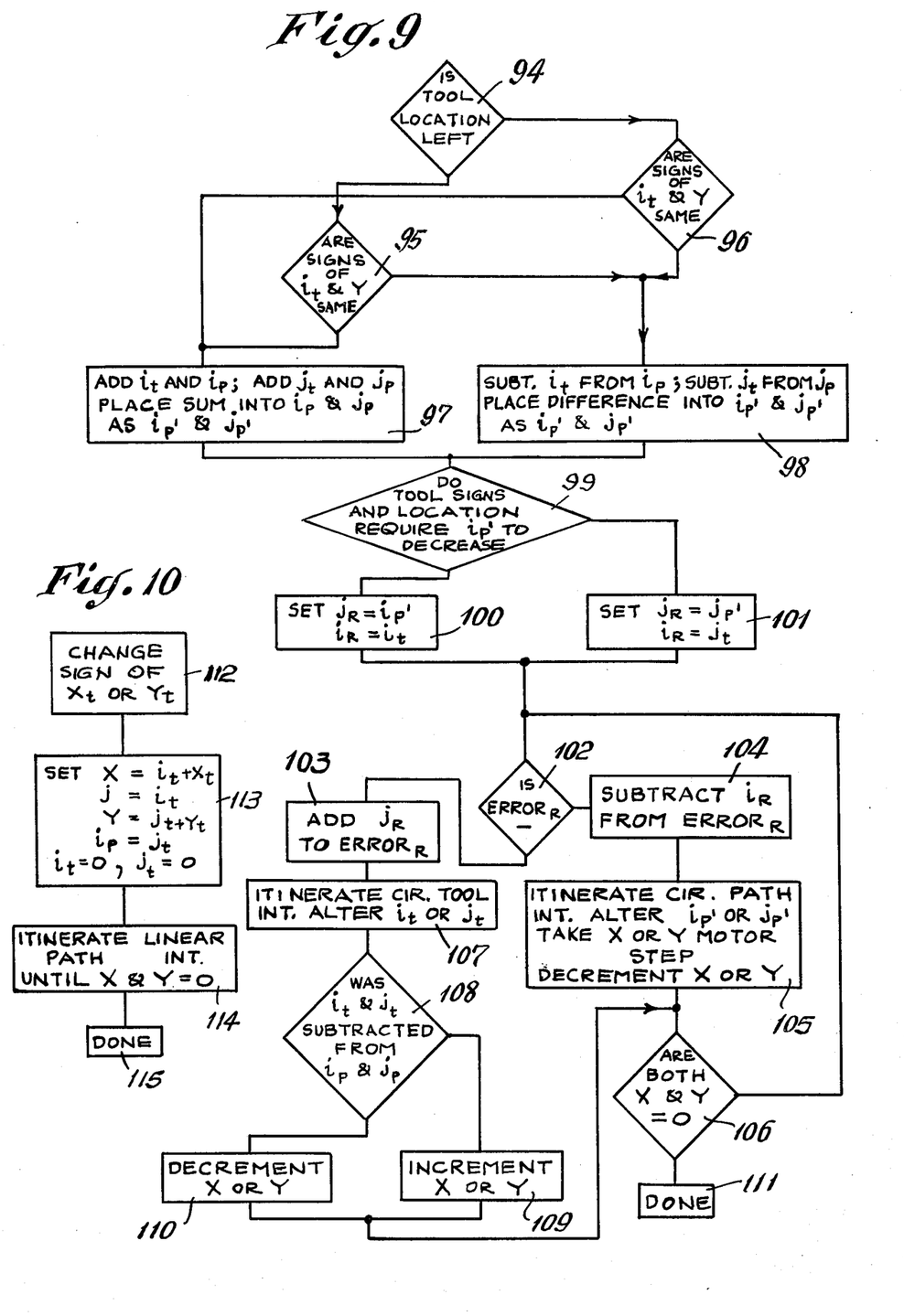
FIG. 9 is a listing of the steps performed during an arcuate tool center movement path as represented in FIG. 8.
FIG. 10 is a listing of the steps performed for carrying out a command to eliminate tool offset.

Referring to FIG. 9, blocks 94, 95 and 96 are used to determined whether the values of the tool center radius (iT, jT) should be added or subtracted from the values of the commanded path (iP, jP) and such a decision is based primarily on the tool location with respect to the path. Blocks 97 and 98 cause performance of the actual algebraic addition and these new radius values, designated iP' and jP', are placed in the registers 23 and 24 respectively.

Blocks 99, 100 and 101 are utilized to place in the iR register the value of either iP' or jP' while its corresponding value, either iT or jT is placed in the jR register. The ratio of the values in the iR and jR registers constitute the proportion of the tool radius to the movement radius (iP', jP') with it having been found only necessary to use the value of iP' or jP' and its corresponding tool radius value instead of both in order to accurately set the ratio. By storing these values in separate registers, a constant ratio for the entire movement path is obtained since the movement path radius values of iP', jP' and the tool radius values of iT, jT change during the movement. The value of iP' or jP' that is to decrease is selected so that it will be assured that a value which is not zero is to be selected.

Though the tool center movement path produced by the NC system is different from the commanded path and normally would require a change in the X and Y commanded path values, the present system however does not alter the command for the extent of the arc as set by the X and Y numerical values for the path. The system, while using the X and Y values to set the extent of movement as in the NC systems disclosed in the above-noted patents, does however change these values in the manner shown in the operations disclosed in FIG. 9 during the processing of the commanded path.

As the arc to be produced by the circular path interpolator using iP' and jP' will have a different extent than the X and Y command path values in the registers 21 and 22, the present system provides a plurality of successive increments with the proportioning of each increment into either a tool radius or movement radius increment in accordance with the ratio of the tool radius to the movement radius as stored in the jR and iR registers respectively. Each movement radius or path increment decrements either the X or Y register and produces an actual movement step while each tool radius increment alters the count of the X or Y registers without producing any movement.

The determination of whether iP' or jP' is to decrease during the movement uses structure similar to the structure that effects the commands in blocks 64 and 65. Thus the tool is on the left of the path and the signs of XT and YT are the same (++ or --) then iP' is decreased while for the tool on the right, jP' is decreased for identical signs. For opposite tool signs, the other register is decreased.

With the iR and jR registers set, the ratio interpolator means 46 determines by way of blocks 102, 103 and 104 and registers iR, jR and error R, whether an increment should be either a tool radius increment or a movement path increment. For each increment selected to be a tool radius increment, the value of the register jR is added to the error R register by block 103, while for increment determined to be a movement radius increment, the value of register iR is subtracted from the error R register. By using the block 102 to sense the algebraic sign of the error R register and providing a tool radius increment whenever it has a minus count and a movement radius increment when it has a + or 0 count, the increments are proportioned according to the ratio of their radius values.

A movement radius increment directed to the block 104 is a movement path increment that causes the steps to be performed in the block 105 which directs that the increment become an actual step in the movement path. The axis on which the step is taken is determined by the circular path interpolator means 26 and either the X register 21 or Y register 22 is decremented. A block 106 questions if the extent of the remaining movement required by the path commands values in the X and Y registers extents is zero and if not, directs that the next increment be processed.

As the count of the error R register changes with each increment, it directs only when minus that the next increment become a tool radius increment and the operations recited in the block 107 are performed. This block itinerates the circular tool interpolator means 44 for one step to determine on which axis a step would be taken and alters the value either of iT and jT. A block 108 is then encountered which recalls which block, 97 or 98, was utilized to determine the value of iP' and jP'. If block 97 was used, so that iP' is greater than iP, which would produce an arc such as the arc 92 in FIG. 8, then a block 109 increments either the X register 21 by a value of one if the circular tool interpolator means 44 determined that the increment was an iT increment or increments the Y register 22 by a value of one if a jT increment was determined.

Figure 8:
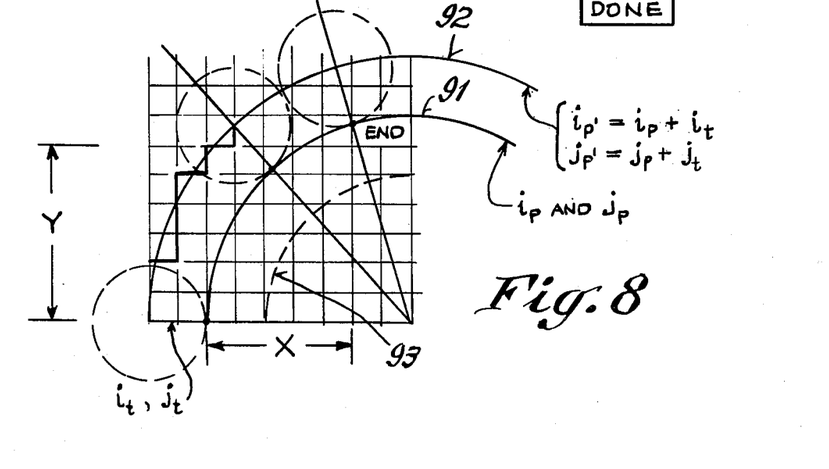
FIG. 8 is a diagrammatic representation of an arcuate commanded path and two typical tool center movement paths that may occur.

For a value of iP' that is less than the value of iP, as set by the block 98 so as to produce an arc such as the arc 93, a block 110 would cause either the X or Y registers 21 or 22 to be decremented by a value of 1 for each tool radius increment.

A tool radius increment though not used to produce movement, is used to maintain the values of the position of the tool center (iT, jT) and to alter the count of the X and Y registers for the proportion of the actual movement path that is attributable to the tool radius.

After the steps in either block 109 or 110 have been performed, the system questions, by way of block 106, if the extent of the commanded path on the X and Y axis has been produced by registers 21 and 22 having a zero count. If not, then another increment is processed by questioning the block 102 to determine whether the increment is to be a movement path increment or a tool radius increment. Increments are successively processed until both the X and Y registers have a zero count which occurs when the system has produced the commanded movement as indicated by the "DONE" block 111.

In the event that there is a command to remove tool offset, indicated by the block 59 in FIG. 2, then the operations disclosed in FIG. 10 are effectuated. The removal consists of linearly moving the tool center from its present position along its radius to the end of the last terminated commanded path. The movement is defined by the values of iT and jT and the determination of the axis for the successive steps is made by using the linear path interpolator means 26.

In the operations performed, a block 112 changes one of the signs of the tool, namely XT or YT. These signs, if not changed are those that would command a movement parallel to the last movement. To determine which tool sign to change, the block 112 compares the tool signs and tool location and directs that the sign of YT be changed for the conditions of tool location left and both tool signs alike or for the sign of XT to be changed if the signs are unlike. For tool location right and like tool signs, XT is changed while if unlike YT is changed. Such a hardwire structure would be similar to that described in connection with blocks 64 and 65.

A block 113 then sets the values of the X and Y registers, 21 and 22 to the values in the iT and jT registers and then sets the latter to zero. Also the signs are set to be those of the tool signs while the values of iP and jP are also set to the values of jT and iT respectively, as indicated.

A block 114 then instructs the linear path interpolator means 26 to be operated as if it had a linear commanded path with there being a determination of the axis on which each successive step is to be taken, the moving of a step and the decrementing of either the X or Y registers for each step. Further movement is stopped and tool offset is eliminated when both the X and Y registers have a zero count.

Reference has been made to a linear path interpolator means 26 and a separate circular path interpolator means 27 for ease of explanation. As disclosed in said above noted patents, however, it is preferred only the structure for one interpolator means be used with interconnections to and including the registers 21-24 and 30 together with structure for directing its use in either a linear mode or a circular mode.

It will accordingly be understood that there has been disclosed a numerical control system which is capable of providing movement on a path that is offset a commanded value from a programmed path. The system that produces the movement is preferably of the type that utilizes axis determination of sequential steps and thus has a path interpolator means for linear and circular movement. The offset is produced by the addition of tool interpolator means together with a slope comparator and ratio interpolator. By the use of these means, the system is capable of providing the tool offset without requiring all data defining the next programmed path and without altering the manner in which the axis determination for the movement path functions.

Variations and modifications may be made within the scope of the claims and portions of the improvements may be used without others.

We claim:

1. A numerical control system for producing a tool center movement along two axes that is offset a desired value from a commanded path comprising means for producing independent stepwise movement along each axis, means for accepting information of the commanded path, circular path interpolator means for determining the axis on which successive steps are to be produced for an arcuate commanded path, linear path interpolator means for determining the axis on which successive steps are to be produced for a linear commanded path, means for receiving the desired value of the offset, circular tool interpolator means for determining the axis on which successive steps should be taken for an arc having a radius equal to the desired offset value, slope comparator means for causing the tool center to be located on a line normal to the extent of the commanded path at the beginning of the commanded path and ratio interpolator means for causing the extent of the tool center movement to be limited to that commanded by the extent of the commanded path, in which the circular tool interpolator means includes a pair of registers for maintaining the extent that the tool center is offset along each axis, an error register for determining upon actuation the axis on which the next step should be taken and means for maintaining an indication of the direction on each axis of the tool center offset and in which the slope comparator means includes means for comparing the instantaneous extent of the tool center offset with the instantaneous extent of a slope line normal to the beginning of the commanded path, means for sequentially altering either extents and means for terminating the altering when the extents are essentially equal.

2. The invention as defined in claim 1 in which the terminating means terminates the means for sequential altering when the extents of the slope line and the tool center offset are within one step of each other.

3. The invention as defined in claim 1 in which the means for sequentially altering the extents includes means for changing the extent having the lesser extent by one step.

4. The invention as defined in claim 3 in which the sequentially altering means includes means for changing the tool center offset extent, means for directing the circular tool interpolator means to itinerate one step to determine the axis on which a step should be taken and means for producing a step on the determined axis.

5. The invention as defined in claim 1 in which the ratio interpolator means includes means for sequentially directing either the circular path interpolator means to determine the axis on which the next step should be taken or the circular tool interpolator means for determining the axis on which the next tool step should be taken.

6. The invention as defined in claim 5 in which the commanded path is arcuate having a command path radius value, in which there are means for algebraically adding the path radius and the offset radius to produce a movement radius and means directing the circular tool interpolator means to produce an arcuate movement using the movement radius.

7. The invention as defined in claim 5 in which the commanded path is arcuate having a commanded extent along each of the two axes, in which the circular path interpolator means decrements the commanded path extent for each step it determines and in which altering the circular tool interpolator means alters the commanded path extent by one for each step it determines.

8. The invention as defined in claim 7 in which the circular tool interpolator means increases the instantaneous value of the command path extent for each step it determines for a movement radius that is less than the commanded path radius.

9. The invention as defined in claim 7 in which the circular tool interpolator means decreases the instantaneous value of the commanded path extent for each step it determines for a movement radius that is greater than the commanded path radius.

10. The invention as defined in claim 5 in which the ratio interpolator means includes means for directing the steps sequentially to either the circular path interpolator means or the circular tool interpolator means in accordance with the proportion of the tool radius to the movement radius.

11. The invention as defined in claim 1 in which there are means for sensing the quadrant location of the tool center, means for sensing the quadrant direction of the next commanded path and means for permitting the producing of the movement for the next commanded path only if both the tool center location and commanded path direction are in the same quadrant.

12. The invention as defined in claim 11 in which the permitting means includes means for comparing the quadrant location of the tool center at the end of the past commanded movement and the quadrant direction of the next commanded path and means for directing the circular tool interpolator to move the tool center to be in the same quadrant.

13. The invention as defined on claim 12 in which the permitting means actuates the comparing means at least each time the tool center is moved to be located on an axis.

14. The invention as defined in claim 12 in which the means for directing initially directs the circular tool interpolator means to move the tool center to the axis which would be intersected if the past commanded path were extended.

15. The invention as defined in claim 1 in which the numerical control system includes means for accepting a command to provide initial desired tool offset and in which there are initial offset means for actuating the linear path interpolator means to produce a movement equal to the desired offset value.

16. The invention as defined in claim 15 in which the initial offset means includes means for sensing the direction of movement of the next commanded path and producing movement only along an axis that positions the tool center to move in the same quadrant as the next commanded path.

17. The invention as defined in claim 15 in which the command for tool offset includes a command for the location of the tool center with respect to the path and in which the initial tool offset means produces movement along a selected axis in the direction from the beginning of the commanded path that corresponds to the commanded location.

18. The invention as defined in claim 15 in which the commanded value of the desired tool offset is received as twice the desired offset value and in which the initial offset means causes the linear path interpolator means to produce a movement for only one half the commanded value.

19. The invention as defined in claim 15 in which the circular tool interpolator means includes a pair of registers and in which there are means for altering the registers to correspond to the extent of movement produced by the initial offset means.

20. The invention as defined in claim 1 in which the numerical control system has means to accept a command to eliminate tool offset, in which the circular tool interpolator has tool registers whose values define the location of the tool center and in which there are offset eliminating means for directing the location defining values in the tool registers to the linear path interpolator means and actuating the said interpolator means to produce a movement that equals the values.

21. A numerical control system for producing a tool center movement along two axes that is offset a desired value from a commanded path comprising means for producing independent stepwise movement along each axis, means for accepting information of the commanded path, circular path interpolator means for determining the axis on which successive steps are to be produced for an arcuate commanded path, linear path interpolator means for determining the axis on which successive steps are to be produced for a linear commanded path, means for receiving the desired value of the offset, circular tool interpolator means for determing the axis on which successive steps should be taken for an arc having a radius equal to the desired offset value, slope comparator means for causing the tool center to be located on a line normal to the extent of the commanded path at the beginning of the commanded path and ratio interpolator means for causing the extent of the tool center movement to be limited to that commanded by the extent of the commanded path and in which the slope comparator means includes means for comparing the instantaneous extent of the tool center offset with the instantaneous extent of a slope line normal to the beginning of the commanded path. means for sequentially altering either extents and means for terminating the altering when the extents are essentially equal, in which the means for sequentially altering the extents includes means for changing the extent having the lesser extent by one step, in which the sequentially altering means includes means for changing the slope line extent including a slope line register for each axis, means for directing the linear path interpolator means to itinerate one step using the reverse values of the extent of the commanded path to determine the axis on which a step should be taken and means for incrementing the slope line register for the axis so determined.

* * * * *